Sept. 1, 1964      W. C. MOORE ETAL      3,146,775
ILLUMINATING MEANS FOR MEDICAL INSTRUMENTS
Filed Oct. 29, 1962

INVENTORS
WILLIAM C. MOORE
JOHN D. CONNORS
BY Richard von K. Bruns
Atty.

United States Patent Office 3,146,775
Patented Sept. 1, 1964

3,146,775
ILLUMINATING MEANS FOR MEDICAL INSTRUMENTS
William C. Moore, Skaneateles, and John D. Connors, Auburn, N.Y., assignors to Welch Allyn, Inc., Skaneateles Falls, N.Y., a corporation of New York
Filed Oct. 29, 1962, Ser. No. 233,748
6 Claims. (Cl. 128—6)

This invention relates generally to specula for medical diagnostic instruments having means for light emission at the distal end thereof. More specifically, the invention is directed to a speculum utilizing coated light-transmitting filaments for conducting light to the distal end of the instrument, which speculum has a separable filament-protecting distal tip portion and a molded body portion having the filaments molded integrally in the sidewall thereof. The invention is directed also to a method for making such a speculum.

Copending application Ser. No. 49,623, filed August 15, 1960, by applicant William C. Moore, now abandoned, discloses a speculum having a bundle of coated light-transmitting filaments for conducting light to the distal end of the speculum from a source near the proximal end. At the proximal end of the speculum, the bundle is offset and spaced from the axially extending viewing passage through the speculum and is bonded to the speculum sidewall. Intermediate the ends of the speculum the light-transmitting filaments are fanned out from the bundle and bonded to the sidewall around the viewing passage until, at the distal end of the speculum, the filaments are disposed in a full circle, or portion of a circle, along the inner surface of the sidewall extending axially of the speculum. At this point, the filaments are provided with transversely ground, light-emitting terminal surfaces facing distally at the end of the speculum. Improved viewing results from offsetting the light carrying elements around the viewing passage, and this arrangement leaves the entire passage free for viewing and for insertion of an operating instrument therethrough when necessary. Since the proximal light-receiving end of the bundle is offset from the line-of-sight through the passage, a larger than conventional lamp or other light source can be used at the proximal end of the speculum to provide more light at the viewing area. More uniform illumination is also obtained when the light transmitting filaments are disposed completely around the viewing passage and the viewing axis and light emission axis coincide.

While the above mentioned earlier development has resulted in a greatly improved viewing and illumination arrangement, it has been found that if the field to be viewed is immediately adjacent the end of the speculum there is sometimes a dark or poorly illuminated spot at the center of the field. Moreover, when the filaments extend along the inner surface of the speculum sidewall to the very end thereof, they may become damaged during cleaning or sterilizing, and the light emitting surfaces of the filaments may become covered or screened during use by body secretions or other foreign matter in the body passage being examined.

The principal object of the present invention, accordingly, is to provide a speculum, for diagnostic instruments which have a light source, having an unobstructed viewing passage therethrough, and, at the same time, having light transmitting means capable of increased light emission which uniformly illuminates the field to be viewed.

Another important object is to provide a speculum with a detachable tip portion which speculum may be more easily cleaned and sterilized, is less easily damaged, and ensures uniform illumination.

Still another object is to provide a speculum body having a bundle of coated light-transmitting filaments integrally molded or otherwise fixed in the sidewall thereof, the filament bundle having a light receiving surface at the proximal end of the body offset from the axis of the viewing passage through said body and the filaments of the bundle having light emitting surfaces adjacent the distal end of the body disposed around the viewing passage for uniform illumination of an object beyond the end of the passage.

Another object is to provide a two-part hollow speculum having a main body portion with light transmitting filaments therein, and a separate hollow tip portion detachably secured to the body portion at the distal end thereof for protecting the distal ends of the filaments and ensuring uniform illumination of the field to be viewed.

Still other objects and advantages will become apparent from the following detailed description taken in conjunction with the accompanying drawing, in which.

Figure 1:
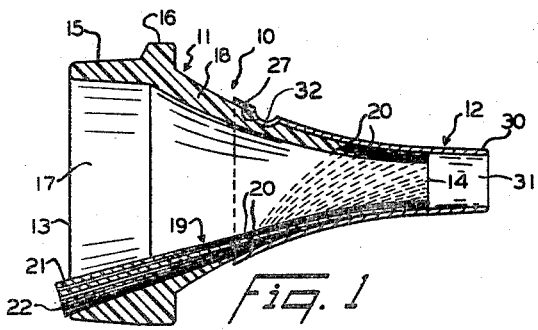
FIGURE 1 is a longitudinal sectional view of an assembled speculum according to the invention.
Figure 2:
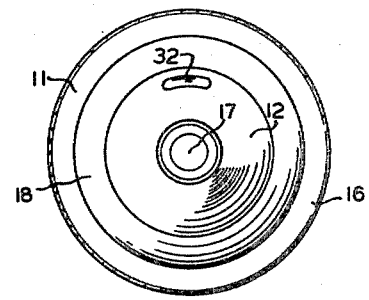
FIGURES 2 and 3 are end elevational views thereof as viewed from the right and left respectively in FIG. 1.
Figure 3:
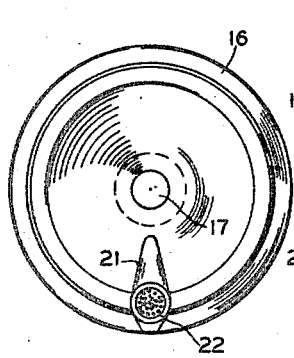

Referring more particularly to FIGURES 1–3, a speculum 10, which, for the purpose of the disclosure, is shown as an otoscope speculum, has a hollow body portion 11 and a hollow distal tip portion 12 which fits over the distal end of the body portion and project outwardly therefrom as shown.

The body portion 11 is preferably formed of molded plastic material and has an enlarged proximal end 13 tapering down to a reduced distal end 14. At the proximal end 13, a tapered, axially projecting annular flange 15 provides means for frictional engagement of the speculum with the speculum holder (not shown) of the instrument, and a circular, radially projecting flange 16 provides a finger-grip for attaching and removing the speculum.

A central, axially-extending, viewing passage 17 extends from end to end of the speculum body and its shape conforms generally to that of the exterior of the speculum, as best seen in FIGURE 1. The sidewall 18 of body 11 is of nearly uniform thickness from the flange 16 to the distal end 14. The body has a generally hollow conoidal shape but is slightly curved axially inward, as shown, so that its configuration at the distal end is substantially cylindrical.

Means for transmitting light from a source on the instrument adjacent the proximal end 13 of the speculum to a region adjacent the distal end 14 is provided by a bundle 19 of coated, light-transmitting filaments 20 made of flint glass or similar material. The filaments are initially flexible by reason of their extreme fineness, their diameter being of the order of three thousandths of an inch or less. Each filament has a thin coating of transparent material of a different refractive index than the central core to improve the light conductive power as is known in art.

The bundle 19 has a cylindrical portion 21 of closely packed filaments 20 bonded to and partially imbedded in flange 15 and sidewall 18 at the proximal end of the speculum body portion 11. At this end the bundle is provided with an optically polished surface 22 adapted to face the light source. Distally of the cylindrical portion 21, the bundle is flattened and the filaments 20 spread or fan out on either side and follow the curve of sidewall 18 in spiral paths until, at the distal end, the passage 17 is completely surrounded by filaments which extend in a generally axial direction.

Figure 6:
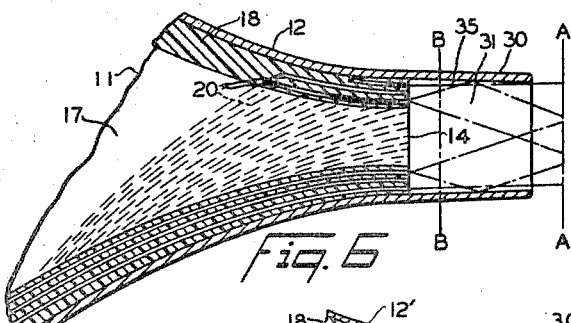
FIGURE 6 is a fragmentary enlarged sectional view similar to FIG. 1 of the distal end portion of a speculum, partly diagrammatic.

An important improvement of the present invention comprises the molding of the portion of bundle 19 distally of the cylindrical portion 21 integrally in the sidewall 18. The filaments 20 are arranged in the space between the core and the outer mold before molding the speculum body 11 so that the fanned-out distal portion of the filaments 20 occupy positions between the inner and outer surfaces of sidewall 18 when body 11 is cast or molded, as best seen in FIGURES 1 and 6.

It will be apparent that the filaments at their distal ends lie along lines lying substantially in an axial plane and extend substantially axially. Since the distal end 14 of body 11 is substantially cylindrical, the distal end of each filament 20 extends substantially parallel to the axis of passage 17 and the filaments surround the passage.

After sidewall 18 is molded, the distal end 14 thereof is optically ground and polished by known means in a plane normal to the axis of passage 17. Each filament 20 is thus provided with an optically polished light-emitting surface lying in the plane of the distal end 14 of the speculum and facing the field to be viewed through passage 17.

Figure 4:
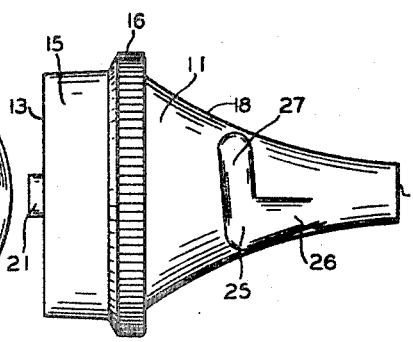
FIGURE 4 is a top plan view of the body portion of the speculum of FIG. 1.
Figure 5:
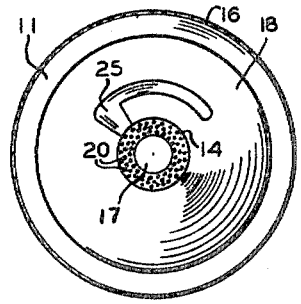
FIGURE 5 is a right end elevational view of the body portion of FIG. 4.

Referring now to FIGURE 4, the exterior surface of sidewall 18 of the speculum body portion 11 has molded or otherwise formed therein an L-shaped groove 25 having an axially extending leg 26 and a transversely extending leg 27 at the proximal end of leg 26. Leg 27 is rounded as best seen in FIGURE 1 and leg 26 is similarly rounded but somewhat wider.

The distal tip portion 12 of speculum 10 is formed of a highly polished metal, or of plastic material or paper when a disposable tip is desired, and the plastic or paper is of a color which reflects white light. Tip portion 12 is also of a hollow conoidal configuration and is shaped to conform to and fit over the outside of the distal end of body 11. Tip 12 extends a substantial distance distally beyond the distal end 14 of the speculum body from a point approximately midway between the proximal and distal ends of body 11. In the case of the otoscope speculum herein shown and described, the tip 12, it will be noted, is of sufficient length to cover that portion of body 11 intended for insertion in the ear canal.

The sidewall 30 of the distally projecting portion is substantially cylindrical, as best seen in FIGURE 1, and defines a viewing passage 31 in prolongation of passage 17 of substantially the same diameter as the distal end 14 of body 12.

Adjacent the proximal end of tip 12, a rounded indentation or detent 32 is formed projecting inwardly for engagement in leg 27 of the groove 25. Detent 32 is of slightly greater width than length as seen in FIGURE 2 and is adapted to travel axially in leg 26 of the groove 25 to the proximal end of that leg. Thereafter, rotation of the tip 12 with respect to the body 11 engages detent 32 in the leg 27 for locking body and tip together.

In operation, the tip portion 12 is placed over the distal end of the body portion 11 and locked thereto by engaging detent 32 in slot 25. Speculum 10 is then inserted in the diagnostic instrument holder, which may be a battery handle, with surface 22 of the bundle 21 facing the lamp or other light source of the instrument.

The filaments 20 conduct the light from the surface 22 to their light emitting surfaces at the distal end 14 of the body portion 11, in well-known manner, when the speculum is in use, and light is emitted distally of body 11 toward the field to be viewed. The light rays are emitted from the distal end of each filament 20 in a conical pattern as indicated by the broken lines 35 in FIGURE 6.

Figure 7:
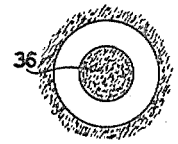
FIG. 7 is a diagrammatic representation of a light pattern cast by the speculum body of FIG. 4.

Should the distal end 14 of body 11 be too close to the field to be viewed, a condition indicated in FIGURE 6 when the field is in the plane indicated at B, it will be apparent that few if any of the light rays will fall at the center of the field. An illumination pattern will then result like that illustrated in FIGURE 7, there being a dark spot 36 at the center.

It is for this reason that the tip portion 12 extends distally beyond body 11. When the field lies beyond the distal end of tip 12, as when it is in the plane indicated at A, FIGURE 6, the whole field is uniformly illuminated. The cone-shaped pattern of emitted light rays from the filaments encircling the passage 17 overlap and a dark spot is prevented.

Furthermore, the inner surface of sidewall 30 reflects back toward the axis of the passage such rays as tend to diverge beyond the limits of passage 31 and substantially all rays of light emitted from the distal end of the filaments 20 are concentrated on the circular area at the distal end of tip 12.

Tip 12 also serves to protect the optically ground and polished distal end surfaces of filaments 20 and prevents any contact of the filament end surfaces with the patient being examined. Any secretions or foreign matter picked up by the speculum remain at the distal end of tip 12 and not on the ends of filaments 20 to screen the emitted light as would be the case if there were no tip. In addition, the tip 12 eliminates the possibility of pain or discomfort from heat as might be the case if the heated filament ends were in direct contact with sensitive skin or tissues in the body cavity of the patient.

At the proximal end of speculum 10 the bundle 21 is offset from the center of passage 17 and its continuation passage 31. The line-of-sight of the viewer may therefore be directly along the axis of passage 17 unobstructed by a lamp or other light source, and the light emitted at the distal end of the speculum is uniformly distributed about this axis—extended at the field being viewed. Passage 17 is also unobstructed for instrumentation, if required.

The tip portion 12 is removable for cleaning or sterilizing by simply rotating it counter-clockwise and withdrawing it from the body portion 11, or, if it is formed of inexpensive plastic or paper, it may be disposed of.

The filaments 20 are molded integrally within the sidewall 18 of the speculum body portion in the embodiment shown and are therefore protected from damage. The body portion 11 may also be cleaned or sterilized when necessary without risk of damage to the filaments.

Figure 8:
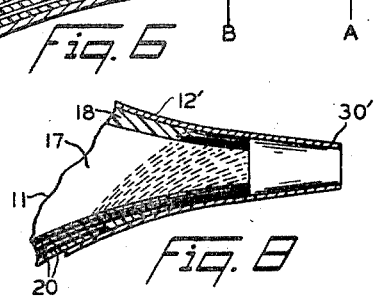
FIGURE 8 is a sectional view similar to FIG. 6 on a reduced scale showing a modified form of speculum tip.

A modified tip portion 12' is shown in FIGURE 8 in conjunction with body portion 11. The tip 12' is formed for engagement with body 11 in the same manner as described in connection with tip 12, and is similarly constructed and used in every way except that the tip 12' projects outwardly beyond the distal end of the body 11 a greater distance and the projecting portion is tapered to a smaller diameter at its distal end. The tips 12 and 12' may be used alternatively in conjunction with the same body 11 thereby resulting in some saving in expense and storage space by reducing the number of speculum body sizes needed for each instrument.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. A speculum for use in a medical instrument having a light source, comprising: a hollow body portion having an axially extending sight passage therethrough, a plurality of light-transmitting filaments embedded in said body portion and extending in an axial direction from the proximal to the distal end thereof, and a hollow light-reflecting tip portion releasably mounted on the distal end of said body portion, said tip portion projecting beyond said body portion and forming an extension of said sight passage for protecting the distal ends of said filaments and spacing them from the distal end of said tip.

2. A speculum for use in a medical instrument having a light source, comprising: a hollow body having a rigid sidewall defining a sight passage extending axially through the body; and a detachable hollow, light-reflecting tip portion separably secured around the distal end of said body; said body sidewall having a bundle of light-transmitting filaments secured integrally therein, said bundle at the proximal end of said body being radially spaced from the axis of said sight passage and adapted to receive light from the instrument light source, the filaments at the distal end of said body being disposed perimetrically about said sight passage and having light-emitting terminal surfaces lying in a common plane, said tip portion extending distally from said body and defining an extension of said sight passage for protecting said surfaces and spacing them from the field to be viewed.

3. In a diagnostic instrument having a light source: a hollow molded speculum body having a substantially rigid sidewall defining a sight passage through the body, a bundle of coated light-transmitting filaments molded integrally in said sidewall, said bundle having a molded solid cylindrical portion adjacent the proximal end of the speculum body off-center from the axis of said sight passage and having its filaments fanned out between the ends of the speculum body so that the filaments are disposed perimetrically about said sight passage at the distal end of said body, the cylindrical portion of said bundle having an optically polished light receiving end surface adapted to face the light source, the filaments at the distal end of said body having optically polished light emitting surfaces lying in a plane coextensive with the plane of said distal end, and a detachable hollow speculum tip engaging the distal end of said body and extending said sight passage distally beyond the body for protecting said light emitting surfaces and spacing them from the field to be viewed.

4. A speculum body having a detachable tip as defined in claim 3, wherein said tip has a rounded internally projecting detent and said body sidewall has an L-shaped groove in the exterior surface thereof whereby said tip is locked to the body by pushing said detent along one leg of said groove and then rotating the tip with respect to the body for engaging the detent in the other leg of the groove.

5. In a diagnostic instrument having a light source: a hollow molded speculum body having a substantially rigid sidewall defining a sight passage through the body, a bundle of coated light-transmitting filaments molded integrally in said sidewall, said bundle having a molded solid cylindrical portion adjacent the proximal end of the speculum body and having its filaments fanned out between the ends of the speculum body so that the filaments are disposed perimetrically about said sight passage at the distal end of said body, the cylindrical portion of said bundle having an optically polished light receiving end surface adapted to face the light source, the filaments at the distal end of said body having optically polished light emitting surfaces lying in a common plane at said distal end, and a hollow polished metal speculum tip detachably secured to the distal end of said body and projecting distally of the body to form an extension of said sight passage for protecting the distal end of the body and for concentrating light emitted from said filaments on the area at the end of said sight passage extension.

6. A hollow molded speculum body for use in a diagnostic instrument having a light source, comprising: a rigid sidewall portion defining a sight passage extending axially through the body, and a bundle of light-transmitting filaments molded integrally into said sidewall portion, said bundle having a molded solid axially extending cylindrical portion at the proximal end of the speculum body off-center and spaced from the axis of said sight passage, said bundle having its filaments fanned out between the ends of the speculum body so that the filaments are axially extending and disposed perimetrically about said sight passage at the distal end of said body, said cylindrical portion having an optically polished light receiving end surface adapted to face the light source, the filaments at the distal end of said body having optically polished light-emitting surfaces lying in a common plane normal to said sight passage axis; and a hollow, polished metal speculum tip detachably secured to the distal end of said speculum body and extending distally of the body in extension of said sight passage for protecting the distal end of said body and for concentrating light transmitted through said filaments on the area at the end of the tip.

References Cited in the file of this patent

UNITED STATES PATENTS

| | | |
|---|---|---|
| 1,849,701 | Allyn | Mar. 15, 1932 |
| 2,273,360 | Kidder | Feb. 17, 1942 |
| 2,797,684 | Moore | July 2, 1957 |
| 2,931,739 | Marzocchi et al. | Apr. 5, 1960 |
| 2,992,956 | Bazinet | July 18, 1961 |
| 3,068,739 | Hicks | Dec. 18, 1962 |

FOREIGN PATENTS

| | | |
|---|---|---|
| 158,149 | Great Britain | Feb. 3, 1921 |